United States Patent [19]

Amano et al.

[11] Patent Number: 5,308,162
[45] Date of Patent: May 3, 1994

[54] TEMPERATURE ABNORMALITY DETECTING STRUCTURE FOR FLUID PIPE

[75] Inventors: Kazuo Amano; Shotaro Yoshida, both of Tokyo, Japan

[73] Assignee: Fujikura Ltd., Tokyo, Japan

[21] Appl. No.: 15,996

[22] Filed: Feb. 10, 1993

[30] Foreign Application Priority Data

| Feb. 13, 1992 | [JP] | Japan | 4-59801 |
| Feb. 13, 1992 | [JP] | Japan | 4-59802 |
| Feb. 13, 1992 | [JP] | Japan | 4-59803 |

[51] Int. Cl.$^5$ .......................... G01J 5/08; G01R 31/08
[52] U.S. Cl. ........................................ 374/131; 374/4; 374/147; 385/12
[58] Field of Search ................. 374/147, 161, 131, 4; 250/227.25, 227.15; 385/12, 15

[56] References Cited

U.S. PATENT DOCUMENTS

| 4,240,747 | 12/1980 | Harmer | 250/227.25 X |
| 4,270,049 | 5/1981 | Tanaka et al. | 250/227.25 |
| 4,362,057 | 12/1982 | Gottlieb et al. | 374/4 |
| 4,767,219 | 8/1988 | Bibby | 374/131 X |
| 4,812,645 | 3/1989 | Griffiths | 250/227.15 X |
| 5,054,935 | 10/1991 | Tanabe et al. | 374/161 X |
| 5,067,810 | 11/1991 | Bu-Abbud | 356/73.1 |

FOREIGN PATENT DOCUMENTS

| 0466155 | 11/1991 | European Pat. Off. . |
| 4-70527 | 3/1992 | Japan . |
| 4-72582 | 3/1992 | Japan . |
| 4-77682 | 3/1992 | Japan . |

OTHER PUBLICATIONS

Patent Abstracts of Japan, vol. 15, No. 433 (P-1271) Nov. 5, 1991 & JP-A-31 80 731 (NKK Corp.) Aug. 6, 1991.
Patent Abstracts of Japan, vol. 6, No. 121 (P-126)(999) Jul. 6, 1982 & JP-A-57 46 138 (Fujitsu K.K.) Mar. 16, 1982.
Patent Abstracts of Japan, vol. 14, No. 027 (P-992) Jan. 19, 1990 & JP-A-12 67 428 (Sasahara Kyuichi) Oct. 25, 1989.
Patent Abstracts of Japan, vol. 6, No. 041 (P-106) Mar. 13, 1982 & JP-A-56 157 833 (Tanaka Masaya) Dec. 5, 1981.
Electronics Letters, vol. 21, No. 23, Nov. 7, 1985, pp. 1061-1062, A. H. Hartog, E. A., "Distributed Temperature Sensing In Solid-State Fibres".

*Primary Examiner*—Daniel M. Yasich
*Attorney, Agent, or Firm*—Frishauf, Holtz, Goodman & Woodward

[57] ABSTRACT

A temperature abnormality detecting structure for a fluid pipe detects a temperature abnormality location by laying an optical fiber serving as a temperature detecting portion of a Ramam scattering optical fiber distribution type temperature sensor along a fluid pipe. The fluid pipe is divided into a plurality of sections in the longitudinal direction, independent optical fibers are laid along the fluid pipe in the respective sections. A portion of the optical fiber laid along one of the adjacent sections is superposed to be laid on a portion of the optical fiber laid along the other of the adjacent sections in the vicinity of each of the respective boundaries of the sections. Since the portion of the optical fiber laid along the pipe of one of the two adjacent sections is superposed on the portion of another optical fiber laid along the pipe of the other of the adjacent sections, if an abnormal temperature change occurs due to a trouble such as leakage or outflow of the fluid from the pipe in the boundary area, the temperature change peak position, i.e., the abnormality occurrence locations is detected by the two different optical fibers. Thus, the detecting accuracy is remarkably enhanced as compared with a case wherein the abnormality is detected by only one optical fiber.

11 Claims, 10 Drawing Sheets

TEMPERATURE ABNORMALITY DETECTING STRUCTURE FOR FLUID PIPE

BACKGROUND OF THE INVENTION

1. Field of the Invention

The present invention relates to a temperature abnormality detecting structure for a fluid pipe, which detects an occurrence location of an abnormality in a pipeline or piping for transporting and flowing various types of fluids, e.g., a low-temperature fluid such as a liquefied natural gas (LNG) and a high-temperature fluid such as a high-temperature vapor, on the basis of a temperature abnormality.

2. Description of the Related Art

In a pipeline for transporting a fluid, e.g., a liquefied natural gas, if the fluid flowing through the pipeline is blown out of the pipeline due to cracking of a transporting pipe, damage or destruction of the pipe, and the like, it may lead to a disastrous accident. The same applies to a piping in a plant or factory which transports a fluid, e.g., various types of chemical products and chemicals, various types of gases, and a high-temperature vapor. In a heat exchange facility, e.g., a heating piping of a building and the like, leakage of a high-temperature heating medium from a pipe may cause a decrease in heating efficiency, in heat exchange efficiency, and the like, although it may not cause a disastrous accident. Therefore, in a fluid pipe as described above, when leakage or outflow of a fluid flowing in the fluid pipe occurs, it is required to immediately detect the location of the leakage or outflow, so that repair and the like of the portion where the leakage or outflow occurs can be quickly performed.

A pipe such as fluid transporting and flowing pipeline and piping as described above transports and often flows therethrough a fluid having a predetermined temperature difference from atmospheric temperature. In such a pipe, the leakage and outflow of the fluid flowing from the pipe to the outside of the path can be detected by detecting the temperature near the pipe. For example, in an LNG transporting pipeline, since the LNG itself has a very low temperature, if the LNG in the pipe leaks or flows to the outside of the pipe due to cracking in the pipe and the like, the temperature near the portion where the leakage or outflow occurs is rapidly decreased. Hence, the occurrence location of the leakage of the LNG can be detected by constantly monitoring the temperature distribution of the pipe in the longitudinal direction. Inversely, in a piping of a high-temperature heating medium, e.g., a high-temperature vapor, since a temperature increase occurs near the portion where the leakage occurs, the occurrence location of the leakage of the high temperature heating medium can be detected by constantly monitoring the temperature distribution of the pipe in the longitudinal direction.

As a sensor capable of monitoring the temperature distribution of a pipe in the longitudinal direction, a Raman scattering optical fiber distribution type temperature sensor is known. An example of a system in which this distribution type temperature sensor is used for detecting an occurrence location of a ground-fault in an electric power cable line is a system disclosed in Published Unexamined Japanese Patent Application No. 1-267428.

A principle of measuring a temperature distribution by the above-described Raman scattering optical fiber distribution type temperature sensor is as below. When light is incident into an optical fiber, the light is scattered due to the small fluctuation of a refractive index in the optical fiber, absorption, or re-emission of light by molecules, atoms of the optical fiber. There are as the scattered light Rayleigh scattering light having the same wavelength as the incident light and Raman scattering light having a different wavelength from the incident light. The latter Raman scattering light is generated by the thermal vibration of molecules, atoms of the optical fiber, and its intensity depends largely upon its temperature. Therefore, when pulse light (normally a laser pulse) having a specific wavelength is used as the incident light, the delay of a period of time until the light is returned as the scattered light and the intensity of the Raman backscattering light are detected, whereby the temperatures of the positions of the optical fiber in the respective directions can be measured. Therefore, when an optical fiber as the temperature detector of the Raman scattering optical fiber distribution type temperature sensor is laid along the pipe of the pipeline or piping as described above, and when the fluid flowing in the pipe leaks or flows to the outside of the pipe due to cracking, damage, and destruction of the pipe, an abnormal temperature outside the pipe is detected, thereby obtaining the abnormality occurrence location.

To perform maintenance and supervision of a pipe, e.g., a pipeline, it is rare to achieve maintenance and supervision of the entire pipeline of a long distance by the same maintenance duty office and person in charge. It is general to divide the pipe of the pipeline into a plurality of maintenance sections and perform maintenance and supervision of the respective sections by different maintenance duty offices and persons in charge. In this case, regarding maintenance and supervision of the pipe, e.g., a pipeline, it is necessary to know which maintenance section the occurrence location of the temperature abnormality belongs to. Particularly, in the vicinity of the boundary between the maintenance sections, it is often necessary to know where a temperature abnormality occurs in the adjacent maintenance sections.

In a piping in a factory or building, a piping for flowing a high-temperature vapor, a heating medium, or the like is often provided to a plurality of rooms through the walls between the rooms. In this case, it is necessary to know in which room the temperature abnormality occurs. Especially, in the vicinity of a wall as the boundary of rooms, it is often necessary to precisely know in which room the temperature abnormality occurs.

According to the Raman scattering optical fiber distribution type temperature sensor as described above, it is possible to detect a temperature distribution of the optical fiber in the longitudinal direction. However, as a matter of fact, its distribution resolution, especially its detecting accuracy of the occurrence location of a temperature abnormality is not very high. Therefore, if the optical fiber of such a temperature sensor is merely laid along the pipe, it is very difficult to precisely detect, in the vicinity of a maintenance section boundary of a pipeline as described above, in which section a temperature abnormality occurs, or to precisely detect, in a piping provided to a plurality of rooms as described above, which room the temperature abnormality location belongs to in the vicinity of a boundary between adjacent rooms.

SUMMARY OF THE INVENTION

The present invention has been made in view of the situation described above, and has as its object to enable, in detection of a temperature abnormality in a fluid pipe of, e.g., a pipeline and a piping by using a Raman scattering optical fiber distribution type temperature sensor, detection of an occurrence location of the temperature abnormality in the vicinity of a boundary between maintenance sections of the fluid pipe or in the vicinity of the boundary of rooms.

According to the first aspect of the present invention, there is provided a temperature abnormality detecting structure for a fluid pipe, for detecting a temperature abnormality location by laying an optical fiber serving as a temperature detecting portion of a Raman scattering optical fiber distribution type temperature sensor along a fluid pipe, wherein the fluid pipe is divided into a plurality of sections in the longitudinal direction, independent optical fibers are laid along the fluid pipe in the respective sections, and a portion of the optical fiber laid along one of the adjacent sections is superposed to be laid on a portion of the optical fiber laid along the other of the adjacent sections in the vicinity of each of the respective boundaries of the sections.

In the temperature abnormality detecting structure according to the first aspect of the present invention, the portion of the optical fiber laid along the pipe of one of the two adjacent sections is superposed on the portion of another optical fiber laid along the pipe of the other of the adjacent sections. Therefore, if an abnormal temperature change occurs due to a trouble such as leakage or outflow of the fluid from the pipe in the boundary area, the temperature change peak position, i.e., the abnormality occurrence location is detected by the two different optical fibers. As described above, when the abnormality occurrence location is detected by the two different optical fibers, its detecting accuracy is remarkably enhanced as compared with a case wherein the abnormality is detected by only one optical fiber. For example, even if the temperature change peak position obtained by one optical fiber is not always clearly present, it can be clarified by superposing the data from the two optical fibers, or even when the temperature peak positional data obtained from the optical fiber is deviated from the true position, an error can be reduced by averaging the positional data obtained by the two optical fibers. Therefore, the abnormality occurrence location in the boundary area can be accurately detected, and which of the sections the abnormality occurrence location belongs to can be accurately determined.

According to the second aspect of the present invention, there is provided a temperature abnormality detecting structure for a fluid pipe, for detecting a temperature abnormality location by laying an optical fiber serving as a temperature detecting portion of a Raman scattering optical fiber distribution type temperature sensor along a fluid pipe, wherein the fluid pipe is divided into a plurality of sections in the longitudinal direction, and two or more different portions of the same optical fiber in the longitudinal direction are superposed to be laid along the fluid pipe in the vicinity of the boundary of sections.

In the temperature abnormality detecting structure according to the second aspect of the present invention, the two or more different portions of the same detecting optical fiber are superposed to be laid in an area (to be referred to as a boundary area hereinafter) in the vicinity of the boundary of the fluid pipe. Therefore, if an abnormal temperature change occurs due to a trouble such as leakage or outflow of the fluid from the pipe in the boundary area, the temperature change peak position, i.e., the abnormality occurrence location can be detected by the two or more portions of the same optical fiber. As described above, when the abnormality occurrence location is detected by the two or more portions of the same optical fiber, its detecting accuracy is remarkably enhanced as compared with a case wherein the abnormality is detected by only one portion of the optical fiber. For example, even if the temperature change peak position obtained by the optical fiber is not always clearly present, it can be clarified by superposing the data from the two or more portions of the optical fibers corresponding to the boundary area, or even when the temperature peak positional data obtained from the optical fiber is deviated from the true position, an error can be reduced by averaging the positional data obtained by the two or more portions of the optical fiber. Therefore, the abnormality occurrence location in the boundary area can be accurately detected, and which of the sections the abnormality occurrence location belongs to can be accurately determined.

According to the third aspect of the present invention, there is provided a temperature abnormality detecting structure for a fluid pipe, for detecting a temperature abnormality location by laying an optical fiber serving as a temperature detecting portion of a Raman scattering optical fiber distribution type temperature sensor along a fluid pipe, wherein the fluid pipe is divided into a plurality of sections in the longitudinal direction, and a surplus portion irrespective of the position of the fluid pipe in the longitudinal direction is formed at a portion of the optical fiber in the longitudinal direction of the optical fiber at least at one portion of the fluid pipe in the vicinity of the boundary of the sections of the fluid pipe.

In the temperature abnormality detecting structure according to the third aspect of the present invention, the portion of the detecting optical fiber in the longitudinal direction is formed as the surplus portion irrespective of the position of the fluid pipe in the longitudinal direction at least at one portion of an area (to be referred to as a boundary area hereinafter) in the vicinity of the boundary of the fluid pipe. In other words, in the fluid pipe temperature abnormality occurrence location detecting system of this type, the detecting optical fiber is laid along the fluid pipe to correspond the longitudinal positions of the optical fiber to the longitudinal positions (distance) of the fluid pipe to provide the temperature peak position to be detected by the optical fiber in relation to the position (distance) of the fluid pipe, thereby detecting the temperature peak position, i.e., the trouble occurrence location of the fluid pipe. In this case, the surplus portion is provided at the optical fiber at least at one portion in the vicinity of the boundary area to eliminate the correspondence of the portion to the longitudinal position of the fluid pipe. Since the surplus portion is irrespective of the temperature peak position of the fluid pipe, the apparent distance detecting accuracy in the vicinity of the boundary area is enhanced due to the presence of the surplus position. As a result, which of the sides with respect to the surplus portion the temperature peak position belongs to can be clearly determined.

More specifically, when an abnormal temperature change occurs due to a trouble such as leakage or outflow of the fluid from the pipe in the vicinity of the boundary of the fluid pipe, if the surplus portion is not formed at the optical fiber as described above, it might not clearly determine which of the sides at the boundary the temperature peak position, i.e., the abnormality occurrence location occurs, but when the surplus portion as described above is formed, for example, at the optical fiber just at the position corresponding to the boundary, the detecting accuracy is improved in the amount corresponding to the length of the surplus portion to clearly determine which of the sides with respect to the boundary the temperature peak position, i.e., the abnormality occurrence location belongs to.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
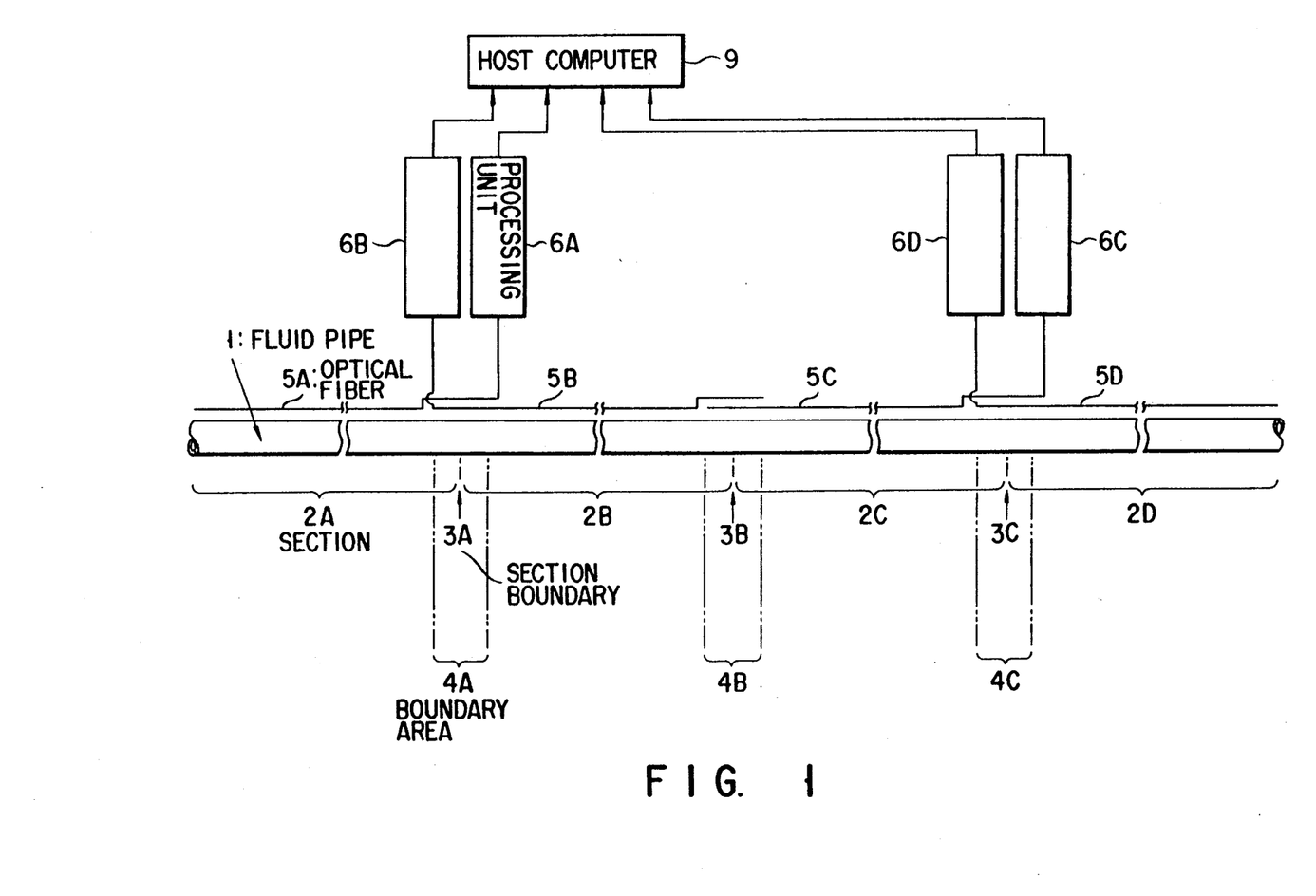
FIG. 1 is a schematic view showing an arrangement of an embodiment according to a temperature abnormality detecting structure of the present invention.
Figure 2:
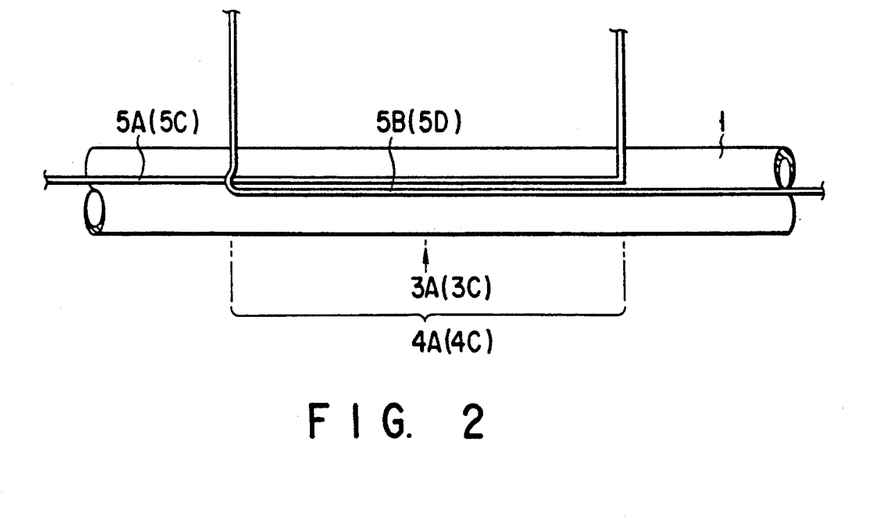
FIG. 2 is a view showing an essential portion of the embodiment of FIG. 1.
Figure 3:
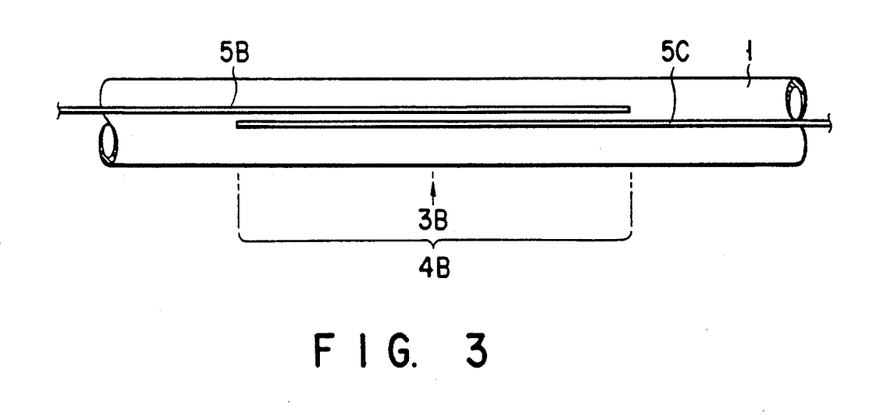
FIG. 3 is a view showing another essential portion of the embodiment of FIG. 1.

FIG. 1 schematically shows an entire arrangement of an embodiment of the present invention, and FIGS. 2 and 3 show a main part thereof.

Referring to FIG. 1, a fluid pipe 1 is a pipe of a pipeline for transporting, e.g., LNG, or a pipe of a piping for transporting and flowing various types of fluids, e.g., a high-temperature vapor and a heating medium, and is divided into a plurality of sections 2A, 2B, 2C, and 2D in the longitudinal direction. The sections 2A to 2D correspond to the respective maintenance sections of, e.g., a pipeline, and the respective rooms in a factory or building. Hence, boundaries (section boundaries) 3A, 3B, and 3C between the sections 2A to 2D correspond to the boundaries of adjacent maintenance sections or boundaries (walls) of adjacent rooms. A range having a predetermined length including the section boundary 3A together with two sides thereof, a range having a predetermined length including the section boundary 3B together with two sides thereof, and a range having a predetermined length including the two sections thereof, are defined as boundary areas 4A, 4B, and 4C.

Separate optical fibers 5A to 5D are respectively laid along the fluid pipe 1 in the sections 2A to 2D. The optical fibers 5A to 5D are respectively connected to distribution type temperature sensor processing units 6A to 6D, which are, in turn, connected to a host computer 9. The optical fibers 5A to 5D are laid for distances longer than the distances of the corresponding sections 2A to 2D, and are respectively laid at the portions, i.e., the end portions or the initial laying portions to be laid along the fluid pipe 1 along the boundary areas 4A to 4C. Thus, two optical fibers are respectively laid along the boundary areas 4A to 4C. More specifically, the initial portions of both the optical fibers 5A and 5B or 5C and 5D to the fluid pipe 1 are superposed to be laid at the boundary area 4A or 4C along the fluid pipe 1 as shown in FIG. 1, and the ends of both the optical fibers 5B and 5C are superposed to be laid in the boundary area 4B as shown in FIG. 3.

Figure 4:
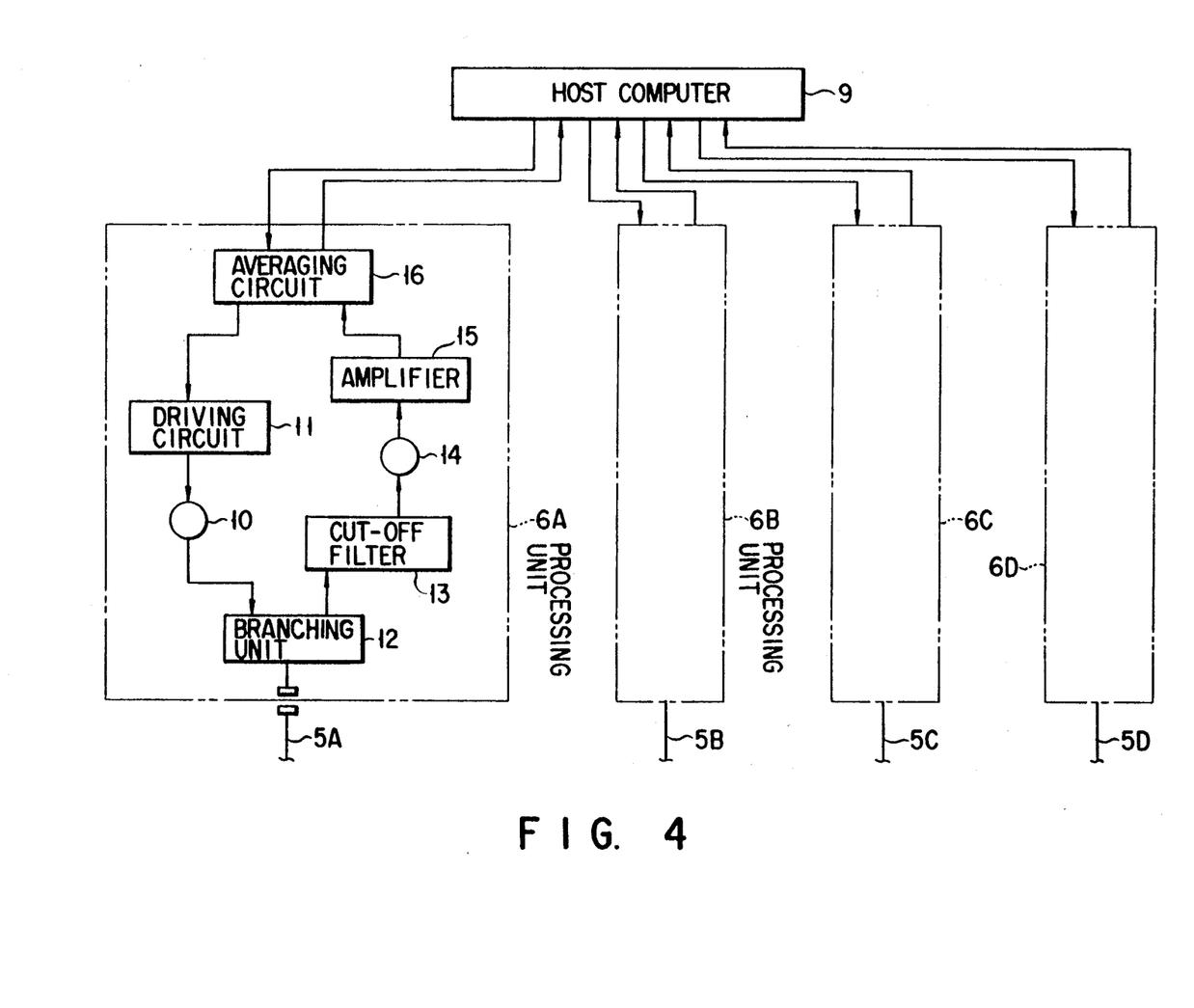
FIG. 4 is a block diagram showing an arrangement of a processing unit used in the temperature abnormality detecting structure of the present invention shown in FIG. 1.

Arrangements of distribution type temperature sensor processing units 6A to 6D respectively connected to the optical fibers 5A to 5D may be the same as conventional ones, and are normally formed as shown in FIG. 4. More specifically, the processing units 6A to 6D emit laser pulse light as incident light to the optical fibers 5A to 5D, isolate Raman backscattering light to be returned from the optical fibers 5A to 5D, photodetect the Raman backscattering light, and amplify and average the same light. As shown in FIG. 4, each processing unit comprises a laser light source 10 for oscillating laser pulse light as incident light to the optical fiber, a driving circuit 11 for driving the laser light source 10, a branching unit 12 for separating Raman scattering light from reflected scattering light to be returned from each of the optical fibers 5A to 5D, a cut-off filter 13 for cutting off the light component except the Raman light in the Raman scattering light, a photodetector 14 for converting the Raman scattering light to be output from the cut-off filter 13 into an electric signal, an amplifier 15 for amplifying the electric signal from the photodetector 14, and an averaging circuit 16 for improving the S/N ratio of the electric signal. The output signals from the respective processing units 6A to 6D (output signals from the averaging circuit 16) are applied to the host computer 9, and a control signal from the host computer 9 is applied to each of the processing units 6. The host computer 9 calculates the electric signals from the processing units 6A to 6D to obtain a temperature distribution in the longitudinal direction of the optical fibers 5A to 5D and to further obtain the temperature peak position, i.e., the temperature increase peak position or the temperature drop peak position. At this time, as described above, since the portions of the two optical fibers are superposed to be laid along the boundary areas 4A to 4C, the host computer 9 calculates the data obtained by the signals obtained from the portions of the two optical fibers and can accurately obtain the temperature peak position.

Assume that the fluid pipe 1 is a pipe for transporting and flowing a low-temperature fluid, e.g., LNG. When leakage or outflow of the low temperature fluid occurs due to cracking, damage, or destruction of the pipe, a decrease in ambient temperature caused by the leakage or outflow is detected by either one of the optical fibers 5A to 5D. When the trouble occurrence location is especially in the vicinity of either one of the section boundaries 3A to 3C, in the boundary area including this section boundary, the two optical fibers detect the temperature drop peak position. Therefore, which section the trouble occurrence location belongs to can be accurately determined by accurately detecting the temperature drop peak position, i.e., the trouble occurrence location. If the sections 2A to 2D are sections (maintenance sections) determined for the purpose of maintenance, which maintenance section the trouble occurrence location belongs to can be accurately and quickly recognized, so that repair can be quickly and smoothly performed.

Assume that the fluid pipe 1 is a pipe for flowing a high-temperature fluid, e.g., a high-temperature vapor or any other heating medium. When a leakage trouble of the high-temperature fluid occurs due to cracking and the like of the pipe, the ambient temperature is increased at the trouble occurrence location and is detected by either one of the optical fibers 5A to 5D. When the trouble occurrence location is especially in the vicinity of either one of the section boundaries 3A to 3C, in the boundary area including this section boundary, the two optical fibers detect the temperature increase peak position. Therefore, which section the trouble occurrence location belongs to can be accurately determined by accurately detecting the temperature increase peak position, i.e., the trouble occurrence location. If the sections 2A to 2D are determined to correspond to the rooms in a factory or building, in which room the trouble occurs can be accurately and quickly recognized, so that repair can be quickly and smoothly performed. Even when a trouble occurs within a wall as the boundary of wall members, this fact can be accurately detected.

Figure 5:
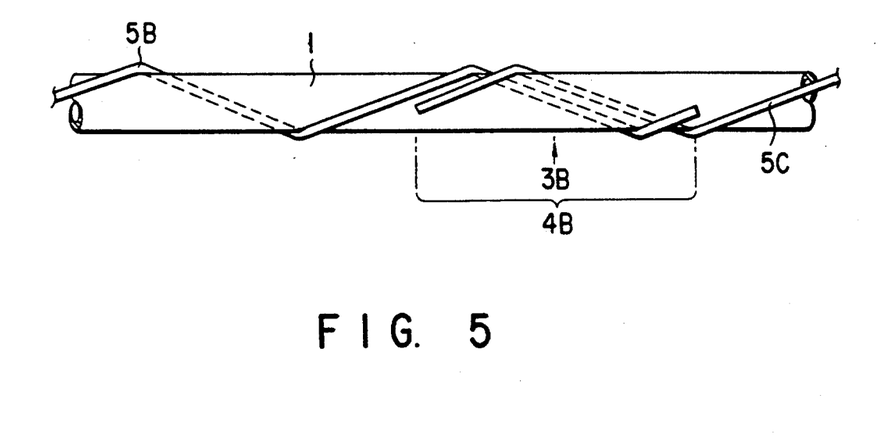
FIG. 5 is a view showing a modification of essential portion of the temperature abnormality detecting structure shown in FIG. 1.

The concrete arrangement in which the optical fibers 5A to 5D are laid along the fluid pipe 1 is optional. For example, as shown in FIGS. 2 and 3, the optical fibers may be supported by suitable supporting means (not shown) to be linearly laid along the longitudinal direction of the fluid pipe 1 or, as shown in FIG. 5, the optical fibers may be spirally wound on the fluid pipe 1. The fact that the portions of the two optical fibers are superposed to be laid along the boundary areas 4A to 4C is not limited to the case wherein the two optical fibers are superposed or arranged adjacently at the same side of the boundary areas 4A to 4C. For example, it may include a case wherein the portions of the two optical fibers are arranged on the opposed surfaces of the fluid pipe 1 in the boundary areas 4A to 4C.

According to the temperature abnormality detecting structure for the fluid pipe of the present invention, when the occurrence location of a temperature abnormality caused by the leakage or outflow of the fluid from the pipe is to be detected by laying the optical fibers as the temperature detectors of a Raman scattering distribution type temperature sensor along the fluid pipe, the portions of the two detecting optical fibers of the two systems are superposed to be laid along the areas in the vicinity of the section boundary of the fluid pipe. Therefore, the temperature peak position, i.e., the occurrence location of a trouble such as leakage or outflow of the fluid is detected by the two separate optical fibers in the areas, hence the position can be accurately detected, and thus at which of the adjacent sections the trouble occurs can be easily determined.

Figure 6:
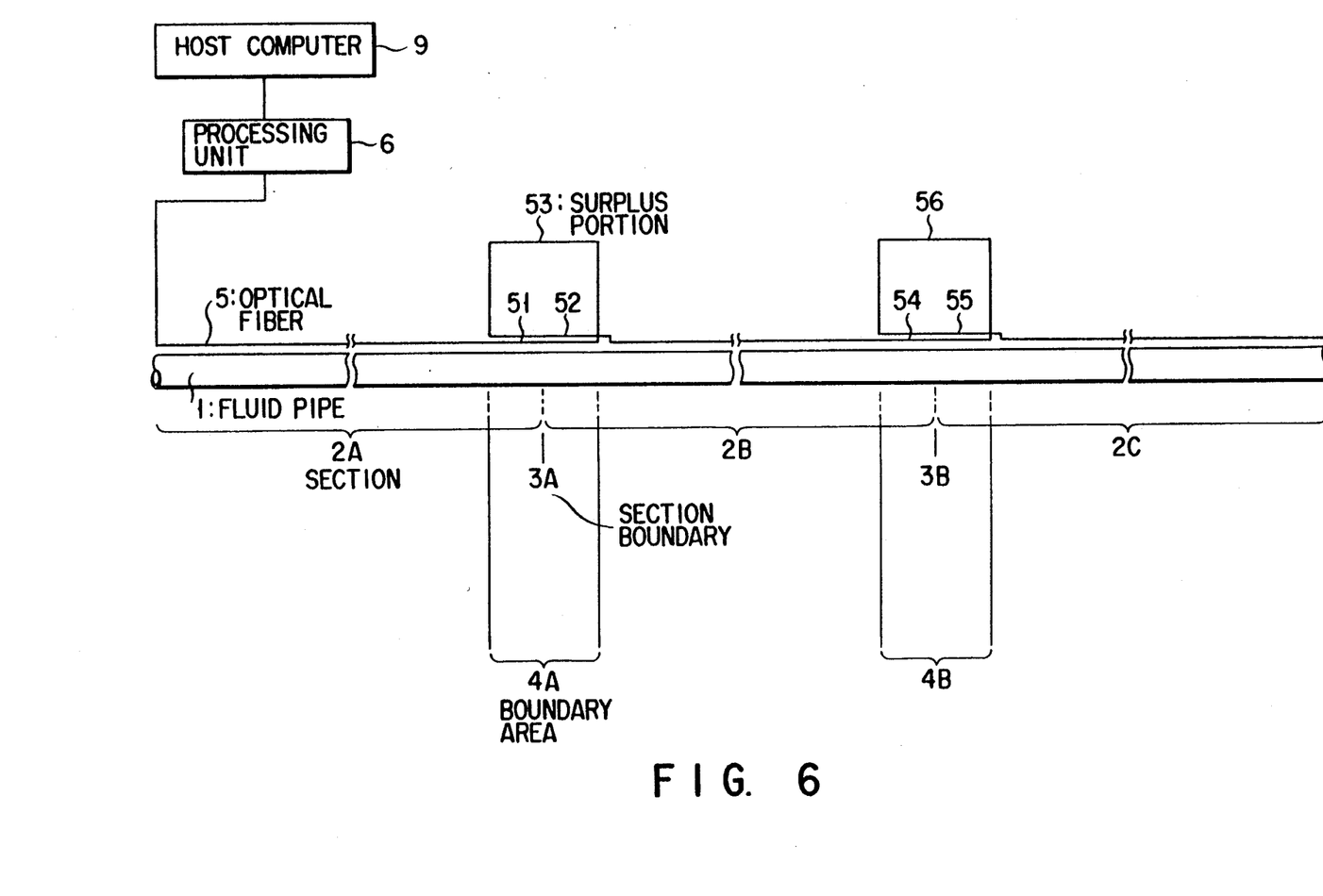
FIG. 6 is a schematic view showing an arrangement of a second embodiment according to a temperature abnormality detecting structure of the present invention.
Figure 7:
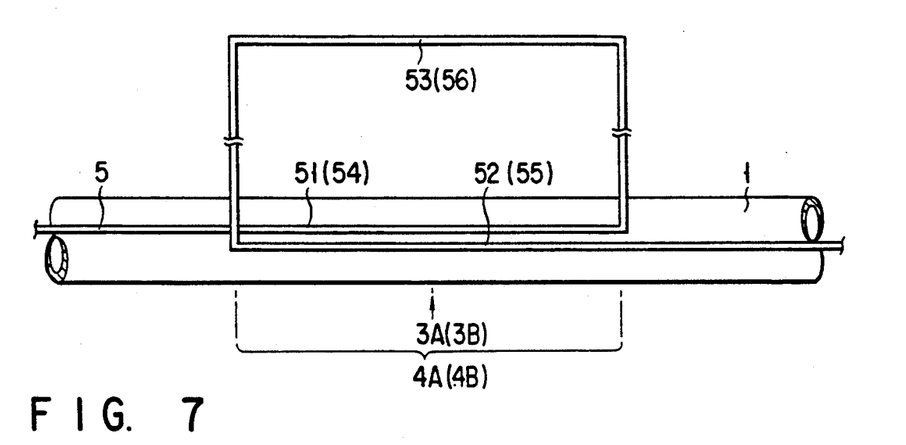
FIG. 7 is a view showing an essential portion of the embodiment of FIG. 2.

FIG. 6 schematically shows an entire arrangement of a second embodiment of the present invention, and FIG. 7 shows a main part thereof.

Referring to FIG. 6, a fluid pipe 1 is a pipe of a pipeline for transporting, e.g., LNG, or a pipe of a piping for transporting and flowing various types of fluids, e.g., a high-temperature vapor and a heating medium, and is divided into a plurality of sections 2A, 2B, and 2C in the longitudinal direction. The sections 2A to 2C correspond to the respective maintenance sections of, e.g., a pipeline, and the respective rooms in a factory or building. Hence, boundaries (section boundaries) 3A and 3B between the sections 2A to 2C correspond to the boundaries of adjacent maintenance sections or boundaries (walls) of adjacent rooms. A range having a predetermined length including the section boundary 3A together with two sides thereof, and a range having a predetermined length including the section boundary 3B together with two sides thereof are defined as boundary areas 4A and 4B.

An optical fiber 5 is laid along the fluid pipe 1 in the sections 2A to 2C. The optical fiber 5 is connected to a distribution type temperature sensor processing unit 6, which is, in turn, connected to a host computer 9. Two portions 51 and 52 disposed at a predetermined interval in the longitudinal direction of the optical fiber 5 are superposed to be laid along the fluid pipe 1. In other words, after the optical fiber 5 is laid at the portion 51 along the boundary area 4A of the fluid pipe 1, a surplus portion 53 is returned in a state isolated from the fluid pipe 1, and again laid at the portion 52 along the boundary area 4A of the fluid pipe 1. Two portions 54 and 55 disposed at a predetermined interval in the longitudinal direction of the optical fiber 5 are similarly superposed to be laid along the fluid pipe 1, and a surplus portion 56 similarly isolated from the fluid pipe 1 is formed between the portions 54 and 55 of the optical fiber 5.

Figure 8:
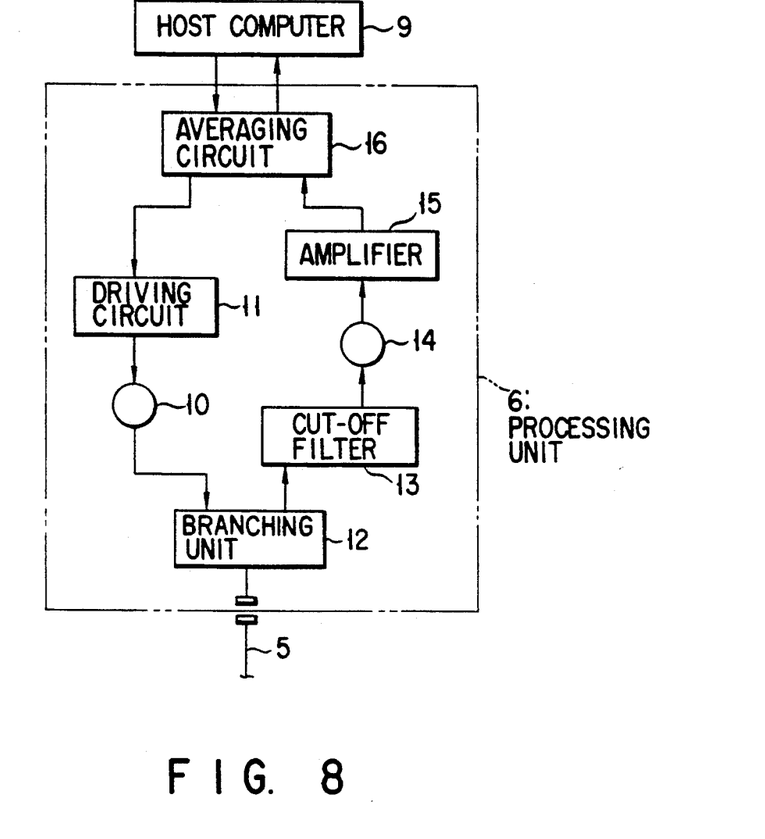
FIG. 8 is a block diagram showing an arrangement of a processing unit used in the temperature abnormality detecting structure of the present invention shown in FIG. 6.
Figure 9:
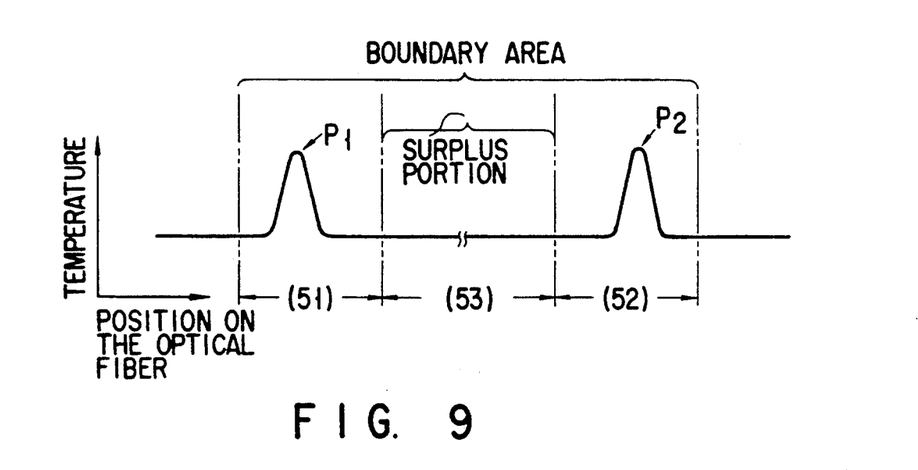
FIG. 9 is a diagram showing the relationship between the longitudinal position of the optical fiber of the arrangement of FIG. 6 and the detecting temperature.

An arrangement of distribution type temperature sensor processing unit 6 connected to the optical fiber 5 may be the same as a conventional one, and is normally formed as shown in FIG. 8. More specifically, the processing unit 6 emits laser pulse light as incident light to the optical fiber 5, isolates Raman backscattering light to be returned from the optical fiber 5, photodetects the Raman backscattering light, and amplifies and averages the same light. As shown in FIG. 8, the processing unit 6 comprises a laser light source 10 for oscillating laser pulse light as incident light to the optical fiber 5, a driving circuit 11 for driving the laser light source 10, a branching unit 12 for separating Raman scattering light from reflected scattering light to be returned from the optical fiber 5, a cut-off filter 13 for cutting off the light component except the Raman light in the Raman scattering light, a photodetector 14 for converting the Raman scattering light to be output from the cut-off filter 13 into an electric signal, an amplifier 15 for amplifying the electric signal from the photodetector 14, and an averaging circuit 16 for improving the S/N ratio of the output signal from the amplifier 15. The output signal (the output signal from the averaging circuit 16) from the processing unit 6 is applied to the host computer 9, and a control signal from the host computer 9 is applied to the processing unit 6. The host computer 9 calculates the output signal from the processing unit 6 to obtain a temperature distribution in the longitudinal direction of the optical fiber 5 and to further obtain the temperature peak position, i.e., the temperature increase peak position or the temperature drop peak position. At this time, as described above, since the two portions 51, 52; 54, 55 having different longitudinal directions of the optical fiber are superposed to be laid along the boundary areas 4A and 4B, the host computer 9 calculates the data obtained by the signal from the portions of the optical fiber, and can accurately obtain the temperature peak position. For example, if a temperature peak occurs in the boundary area 4A, as shown in FIG. 9, temperature peaks P1 and P2 occur at the two portions 51 and 52 of the optical fiber 5. Accordingly, when the host computer 9 stores in advance the length of the surplus portion 53 and the superposing length of the portions 51 and 52, the host computer 9 can accurately obtain the temperature peak position of the boundary area 4A from the two peak positional data.

Assume that the fluid pipe 1 is a pipe for transporting and flowing a low-temperature fluid, e.g., LNG. When leakage or outflow of the low-temperature fluid occurs due to cracking, damage, or destruction of the pipe, a decrease in ambient temperature caused by the leakage or outflow is detected by the optical fiber 5. When the trouble occurrence location is especially in the vicinity of either the section boundary 3A or 3B, in the boundary area including this section boundary, the two portions of the optical fiber 5 detect the temperature drop peak position. Therefore, which section the trouble occurrence location belongs to can be accurately determined by accurately detecting the temperature drop peak position, i.e., the trouble occurrence location. If the sections 2A to 2C are sections (maintenance sections) determined for the purpose of maintenance, which maintenance section the trouble occurrence location belongs to can be accurately and quickly recognized, so that repair can be quickly and smoothly performed.

Assume that the fluid pipe 1 is a pipe for flowing a high-temperature fluid, e.g., a high-temperature vapor or any other heating medium. When a leakage trouble of the high-temperature fluid occurs due to cracking and the like of the pipe, the ambient temperature is increased at the trouble occurrence location and is detected by the optical fiber 5. When the trouble occurrence location is especially in the vicinity of either the section boundary 3A or 3B, in the boundary area including this section boundary, the two portions of the optical fiber 5 detect the temperature increase peak position. Therefore, which section the trouble occurrence location belongs to can be accurately determined by accurately detecting the temperature increase peak position, i.e., the trouble occurrence location. If the sections 2A to 2C are determined to correspond to the rooms in a factory or building, in which room the trouble occurs can be accurately and quickly recognized, so that repair can be quickly and smoothly performed. Even when a trouble occurs within a wall as the boundary of wall members, this fact can be accurately detected.

Figure 10:
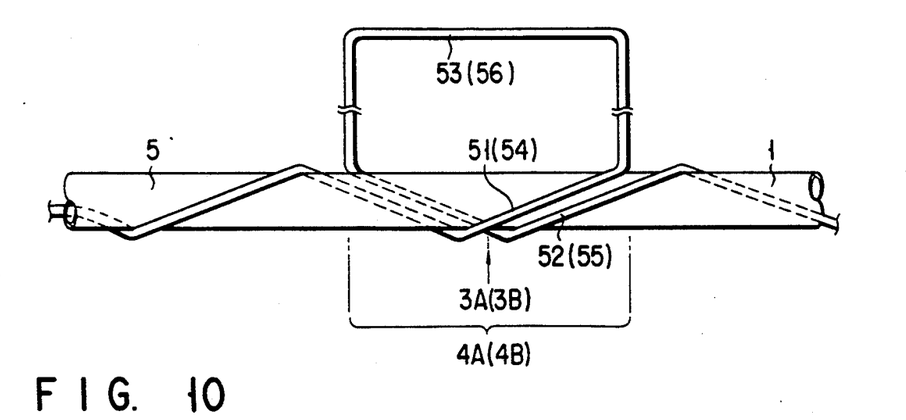
FIG. 10 is a view showing a modification of essential portion of the temperature abnormality detecting structure shown in FIG. 6.

A concrete arrangement in which the optical fiber 5 is laid along the fluid pipe 1 is optional. For example, as shown in FIG. 7, the optical fiber 5 may be supported by suitable supporting means (not shown) linearly along the longitudinal direction of the fluid pipe 1, or spirally wound on the fluid pipe 1 as shown in FIG. 10. The superposition of the two portions of the optical fiber 5 at the boundary areas 4A and 4B is not limited to a case wherein the optical fiber is superposed double at the same side of the boundary areas 4A and 4B or arranged adjacent to each other. For example, it includes the case where the portions of the optical fiber are arranged on the opposed surfaces of the fluid pipe 1 in the boundary areas 4A and 4B.

Figure 11:
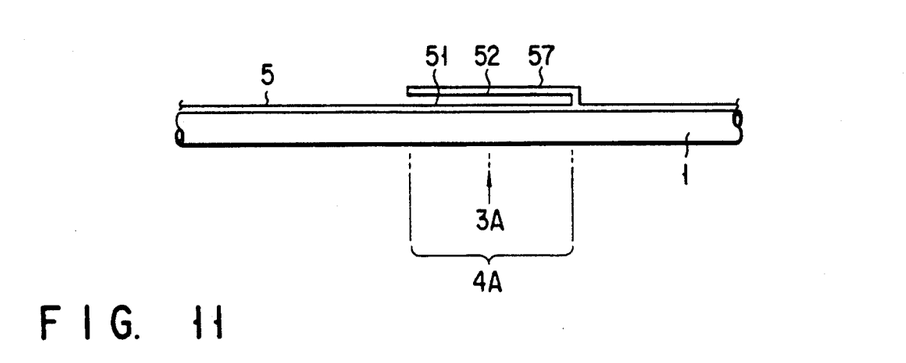
FIG. 11 is a view showing another modification of essential portion of the temperature abnormality detecting structure shown in FIG. 6.

Furthermore, in the embodiment described above, the two portions 51, 52; 54, 55 of the optical fiber 5 are superposed to be laid along the boundary areas 4A and 4B. However, the present invention is not limited to the particular embodiment. For example, three or more portions having different longitudinal directions of the optical fiber 5 may be superposed to be laid along the boundary areas 4A and 4B. For example, as shown in FIG. 11, three portions 51, 52, and 57 of the optical fiber 5 may be superposed to be laid along the boundary areas 4A and 4B. In the example in FIG. 11, a surplus portion is not particularly formed between the portions 51, 52, and 57 of the optical fiber 5.

According to the temperature abnormality detecting structure for the fluid pipe of the present invention, when the occurrence location of a temperature abnormality caused by the leakage or outflow of the fluid from the pipe is to be detected by laying the optical fiber as the temperature detector of a Raman scattering distribution type temperature sensor along the fluid pipe, the two or more different portions of the same optical fiber having different longitudinal directions are superposed to be laid along the boundary areas of the fluid pipe. Therefore, the temperature peak position, i.e., the occurrence location of a trouble such as leakage or outflow of the fluid is detected by the two or more different portions of the optical fiber at the boundary area, hence the position can be accurately detected, and thus at which of the adjacent sections the trouble occurs can be easily determined.

Figure 12:
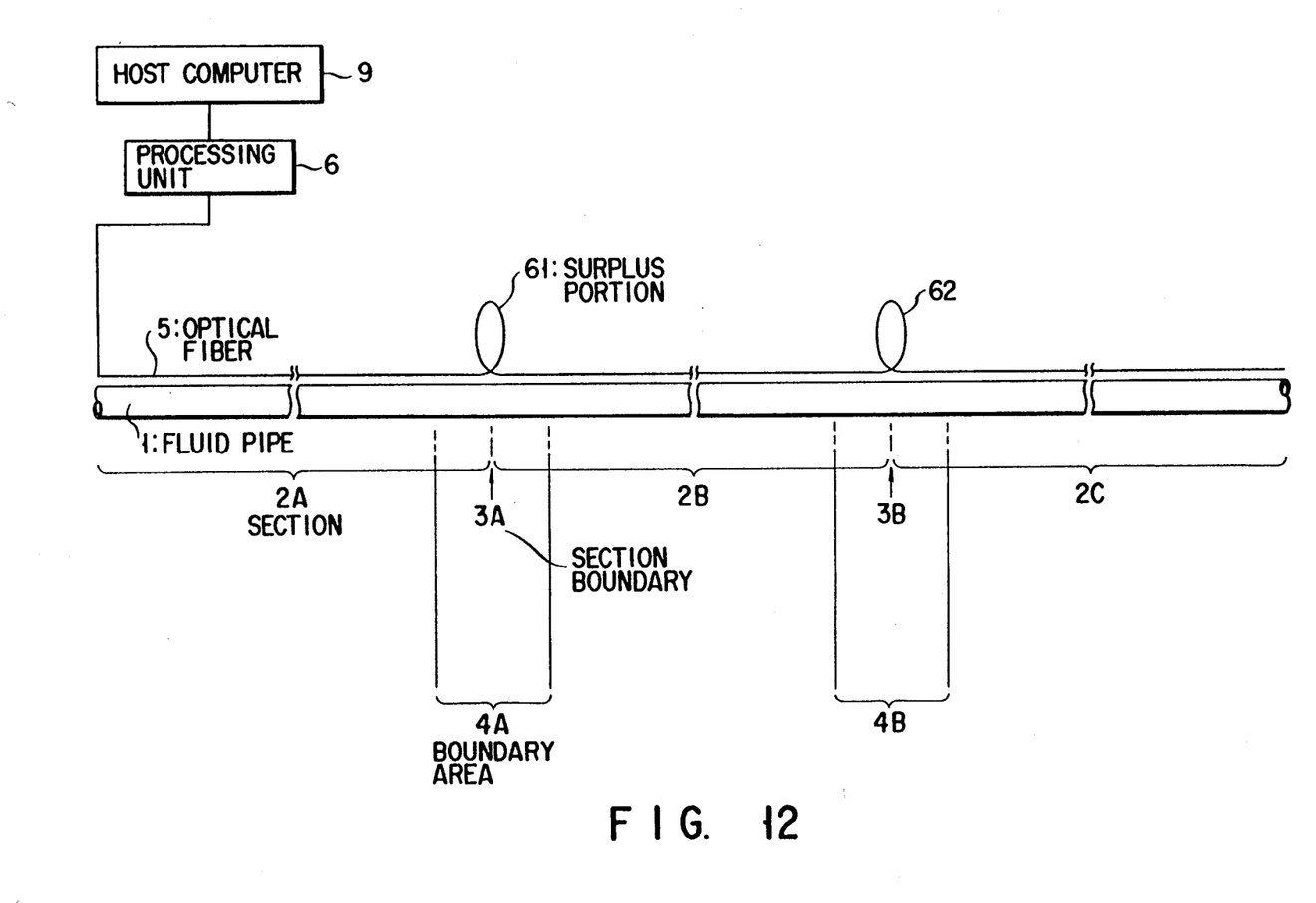
FIG. 12 is a schematic view showing an arrangement of a third embodiment according to a temperature abnormality detecting structure of the present invention.

FIG. 12 schematically shows an entire arrangement of a third embodiment of the present invention.

Referring to FIG. 12, a fluid pipe 1 is a pipe of a pipeline for transporting, e.g., LNG, or a pipe of a piping for transporting and flowing various types of fluids, e.g., a high-temperature vapor and a heating medium, and is divided into a plurality of sections 2A, 2B, and 2C in the longitudinal direction. The sections 2A to 2C correspond to the respective maintenance sections of, e.g., a pipeline, and the respective rooms in a factory or building. Hence, boundaries (section boundaries) 3A and 3B between the sections 2A to 2C correspond to the boundaries of adjacent maintenance sections or boundaries (walls) of adjacent rooms. A range having a predetermined length including the section boundary 3A together with two sides thereof, and a range having a predetermined length including the section boundary 3B together with two sides thereof are defined as boundary areas 4A and 4B.

An optical fiber 5 is laid along the entire length of the fluid pipe 1. The optical fiber 5 is connected to a distribution type temperature sensor processing unit 6, which is, in turn, connected to a host computer 9. The optical fiber 5 is wound at the portion of the longitudinal direction in a loop shape at the central portion of the boundary area 4A, i.e., the section boundary 3A so that the portion is formed as a surplus portion 61. The optical fiber 5 is similarly wound at the portion of the longitudinal direction in a loop shape at the central portion of the boundary area 4B, i.e., the section boundary 3B so that the portion is formed as a surplus portion 62. The surplus portions 61 and 62 wound substantially in the loop shape (i.e., an l-shape) are all isolated from the fluid pipe 1.

Figure 13:
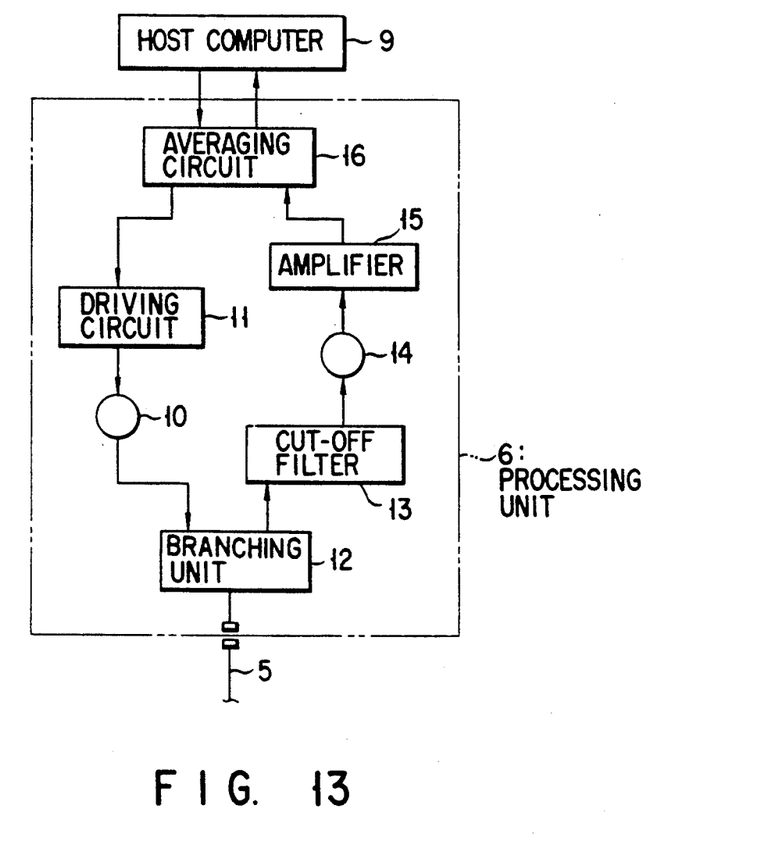
FIG. 13 is a block diagram showing an arrangement of a processing unit used in the temperature abnormality detecting structure of the present invention shown in FIG. 12.
Figure 14:
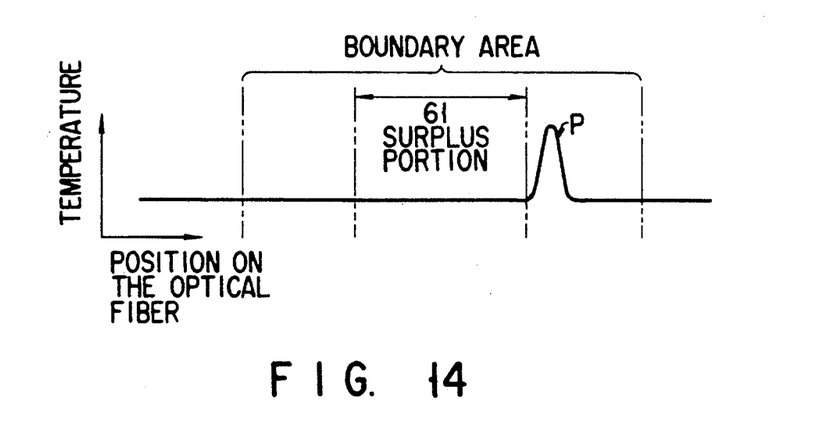
FIG. 14 is a diagram showing the relationship between the longitudinal position of the optical fiber of the arrangement of FIG. 12 and the detecting temperature.

An arrangement of the distribution type temperature sensor processing unit 6 connected to the optical fiber 5 may be the same as a conventional one, and is normally formed as shown in FIG. 13. More specifically, the processing unit 6 emits laser pulse light as incident light to the optical fiber 5, isolates Raman backscattering light to be returned from the optical fiber 5, photodetects the Raman backscattering light, and amplifies and averages the same light. As shown in FIG. 13, the processing unit 6 comprises a laser light source 10 for oscillating laser pulse light as incident light to the optical fiber 5, a driving circuit 11 for driving the laser light source 10, a branching unit 12 for separating Raman scattering light to be returned from the optical fiber 5, a cut-off filter 13 for cutting off the light component except the Raman light in the Raman scattering light, a photodetector 14 for converting the raman scattering light to be output from the cut-off filter 13 into an electric signal, an amplifier 15 for amplifying the electric signal from the photodetector 14, and an averaging circuit 16 for improving the S/N ratio of the electric signal. The output signal (the output signal from the averaging circuit 16) is applied to the host computer 9, and a control signal from the host computer 9 is applied to the processing unit 6. The host computer 9 calculates the output signal from the processing unit 6 to obtain a temperature distribution in the longitudinal direction of the optical fiber 5 and to further obtain the temperature peak position, i.e., the temperature increase peak position or the temperature peak drop position. At this time, as described above, since the surplus portions 61 and 62 are formed at the portions of the central portions of the boundary areas 4A and 4B, i.e., the section boundaries 3A and 3B, the host computer 9 stores in advance the data of the lengths of the surplus portions 61 and 62, calculates the data obtained by the signals from the optical fiber 5 to obtain the temperature change peak position, i.e., the occurrence location of the temperature abnormality, and can accurately detect which of the sides of the centers of the boundary areas 4A and 4B (section boundaries 3A and 3B) the position belongs to. For example, if a temperature peak occurs at the right side (the maintenance section 2B side) of the section boundary 3A at the center of the boundary area 4A, it can accurately detect that the temperature peak position P is located at the right side of the surplus portion 61 of the optical fiber 5.

Assume that the fluid pipe 1 is a pipe for transporting and flowing a low-temperature fluid, e.g., LNG. When leakage or outflow of the low temperature fluid occurs due to cracking, damage, or destruction of the pipe, a decrease in ambient temperature caused by the leakage or outflow is detected by the optical fiber 5. When the trouble occurrence location is especially in the vicinity of either the section boundary 3A or 3B, which section with respect to this section boundary the temperature drop peak position, i.e., the trouble occurrence location belongs to can be accurately determined. If the sections 2A to 2C are sections (maintenance sections) determined for the purpose of maintenance, which maintenance section the trouble occurrence location belongs to can be accurately and quickly recognized, so that repair can be quickly and smoothly performed.

Assume that the fluid pipe 1 is a pipe for flowing a high-temperature fluid, e.g., a high-temperature vapor or any other heating medium. When a leakage trouble of the high-temperature fluid occurs due to cracking and the like of the pipe, the ambient temperature is increased at the trouble occurrence location and is detected by either portion of the optical fiber 5. When the trouble occurrence location is especially in the vicinity of either the section boundary 3A or 3B, which section with respect to this section boundary the temperature increase peak position, i.e., the trouble occurrence location belongs to can be accurately determined. If the sections 2A to 2C are determined to correspond to the rooms in a factory or building, in which room the trouble occurs can be accurately and quickly recognized, so that repair can be quickly and smoothly performed.

Figure 15:
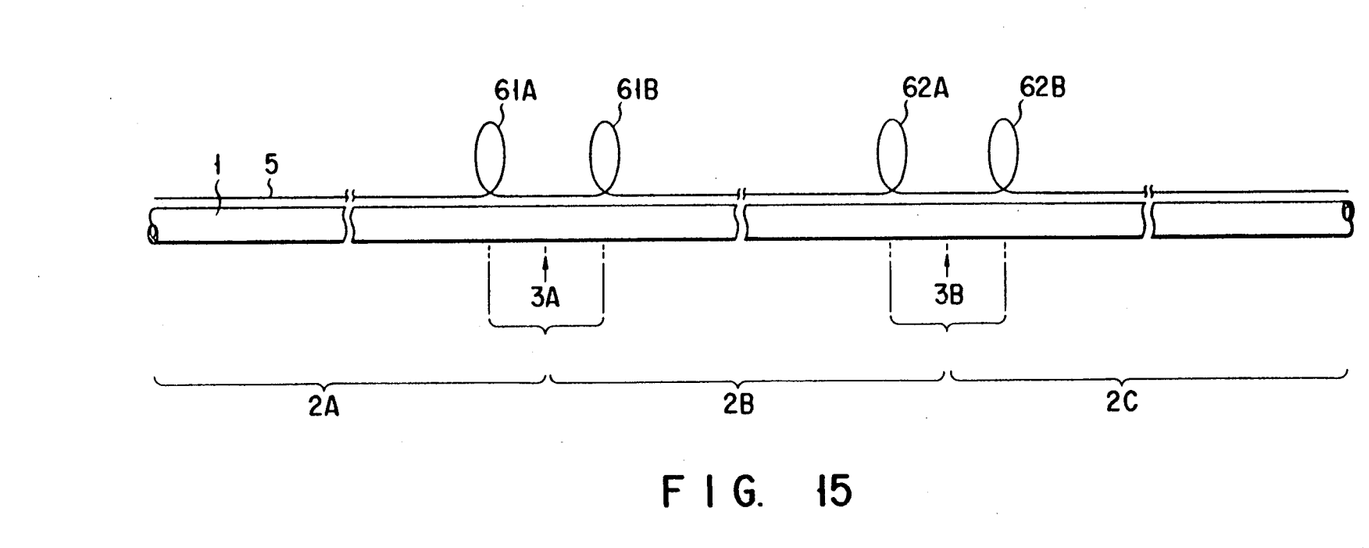
FIG. 15 is a schematic view showing a modification of the arrangement of the third embodiment according to a temperature abnormality detecting structure of the present invention.

FIG. 15 shows a modification of the third embodiment of the present invention. In the embodiment of FIG. 15, loop shaped marginal portions 61A, 61B; 62A, 62B are formed at the positions corresponding to both ends of boundary areas 4A and 4B at an optical fiber 5.

Figure 16:
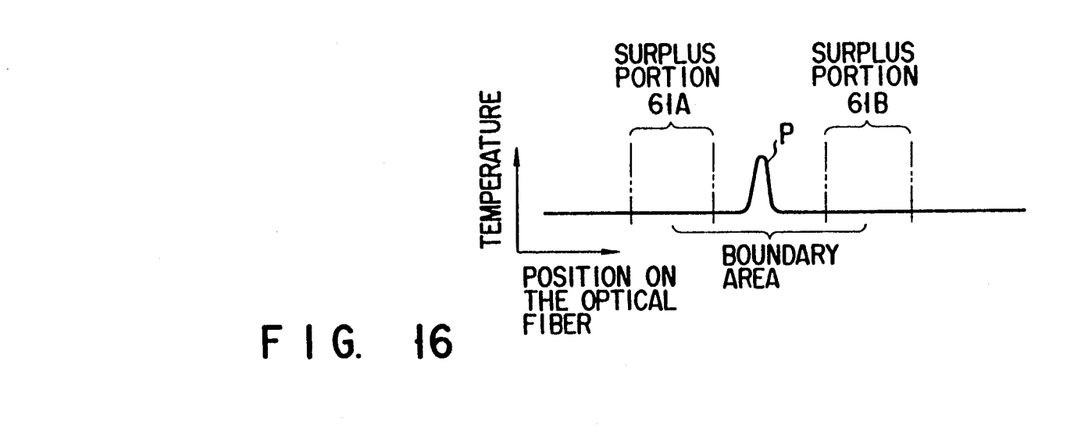
FIG. 16 is a diagram showing the relationship between the longitudinal position of the optical fiber of the arrangement of FIG. 15 and the detecting temperature.

In this modification, if a temperature peak occurs in the vicinities of the boundary areas 4A and 4B, it can be accurately determined at which of inside the boundary areas 4A and 4B and outside the boundary areas 4A and 4B the temperature peak position belongs to. FIG. 16 shows the relationship between the longitudinal position of the optical fiber when the temperature peak P occurs in the boundary area 4A and the detected temperature.

According to the modifications as shown in FIGS. 15 and 16, when the piping is provided to the respective rooms in, e.g., a factory or building, if the thickness of the wall between the adjacent rooms is set within the boundary area, it can be accurately determined at which of inside the wall (in the boundary area) and outside the wall (outside the boundary area) the temperature abnormality caused by the leakage or outflow of the fluid from the piping belongs to.

Figure 17:
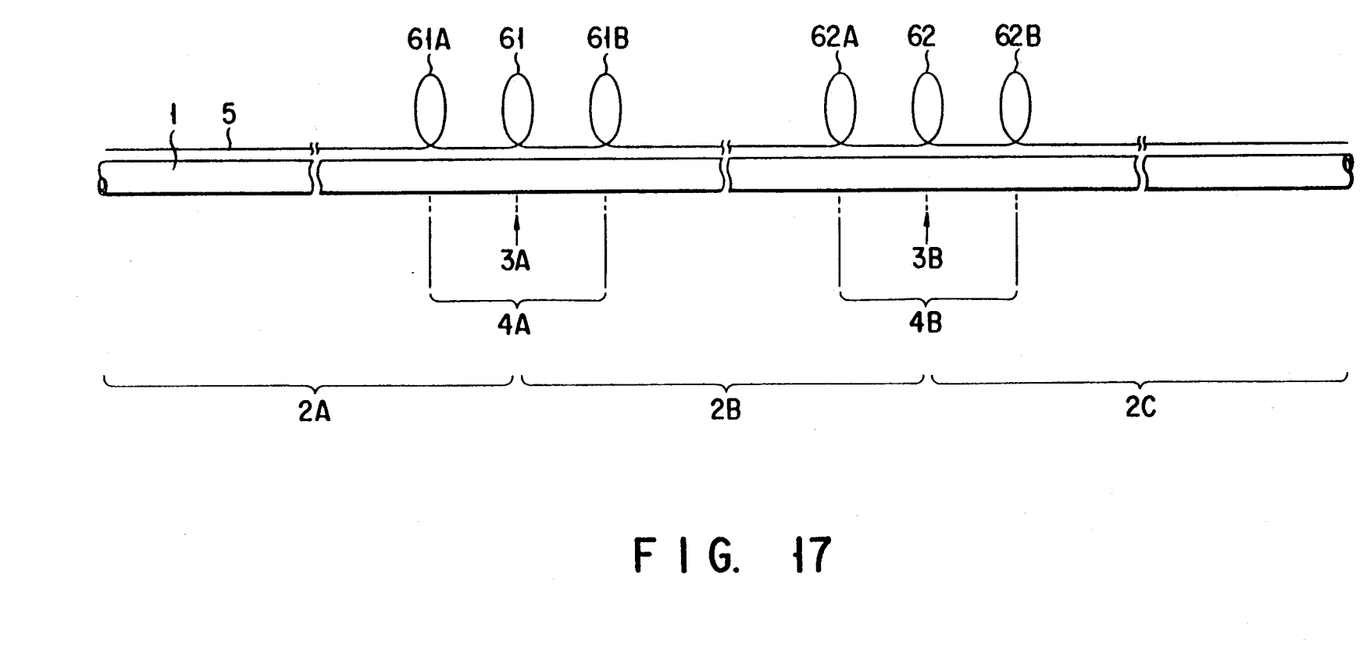
FIG. 17 is a schematic view showing another modification of the arrangement of the third embodiment according to a temperature abnormality detecting structure of the present invention.

FIG. 17 shows another modification as the combination of the embodiment in FIG. 12 and the modification of FIG. 15. In this case, loop-shaped surplus portions 61, 61A, 61B; 62, 62A, 62B are formed at three portions of both ends of boundary areas 4A and 4B and the center (section boundaries 3A and 3B) of an optical fiber 5. According to this embodiment, it can be easily and accurately determined at which of right and left sides of the section boundaries 3A and 3B the temperature peak position belongs to according to the presence of the surplus portions 61 and 62, and it can also be easily and accurately determined at which of inside the boundary areas 4A and 4B the temperature peak position belongs to according to the presence of the surplus portions 61A, 61B; 62A, 62B at both ends of the boundary areas 4A and 4B at the same time.

In the embodiment of FIG. 12 and the modifications of FIGS. 15 and 17, a concrete arrangement in which the optical fiber 5 is laid along the fluid pipe 1 is optional. For example, the optical fiber 5 may be supported by suitable supporting means linearly along the longitudinal direction of the fluid pipe 1, or is spirally wound on the fluid pipe 1.

According to the temperature abnormality detecting structure for the fluid pipe of the present invention, when the occurrence location of a temperature abnormality caused by the leakage or outflow of the fluid from the pipe is to be detected by laying the optical fiber as the temperature detector of a Raman scattering distribution type temperature sensor along the fluid pipe, the surplus portion irrespective of the position of the fluid pipe in the longitudinal direction is formed at least at on portion of the fluid pipe in the vicinity of the boundary area. Therefore, the detecting accuracy of the temperature peak position, i.e., the occurrence location of a trouble such as the leakage or outflow of the fluid with respect to the surplus portion is high, and hence at which of the adjacent sections the trouble occurs can be easily determined.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A temperature abnormality detecting structure for a fluid pipe, for detecting a temperature abnormality location by laying, along the fluid pipe, an optical fiber serving as a temperature detecting portion of a Raman scattering optical fiber distribution type temperature sensor, wherein:

said fluid pipe is divided into a plurality of adjacent sections in a longitudinal direction of said fluid pipe, with adjacent ones of said sections meeting each other at a boundary;

said optical fiber comprises independent optical fibers laid along said fluid pipe in the respective sections, and a portion of one said optical fiber, which is laid along one of the adjacent sections is extended along another of the adjacent sections, so that said extended portion of said one optical fiber is superposed to be laid on a portion of another of said optical fibers, which is laid along said another of the adjacent sections to form a superposed portion of the optical fibers in the vicinity of the boundary of the adjacent sections, to detect temperature data of the boundary of the adjacent sections; and data processing means for processing the detected temperature data to determine whether or not a temperature abnormality occurs at the boundary of the adjacent sections.

2. A temperature abnormality detecting structure according to claim 1, wherein said superposed portions are substantially straightly extended in the longitudinal direction of the adjacent sections.

3. A temperature abnormality detecting structure according to claim 1, wherein said superposed portions are spirally wound around the adjacent sections.

4. A temperature abnormality detecting structure for a fluid pipe for detecting a temperature abnormality location by laying, along the fluid pipe, an optical fiber serving as a temperature detecting portion of a Raman scattering optical fiber distribution type temperature sensor, wherein:

said fluid pipe is divided into a plurality of sections in a longitudinal direction of said fluid pipe, with adjacent ones of said sections meeting each other at a boundary;

said optical fiber is looped, substantially in a shape of rectangle, at least at one portion thereof in the longitudinal direction to form at least one superposed portion of the optical fiber in the vicinity of the boundary of adjacent ones of said sections, to detect temperature data of the boundary of the adjacent sections,; and data processing means for processing the detected temperature data to determine whether or not a temperature abnormality occurs at the boundary of the adjacent sections.

5. A temperature abnormality detecting structure according to claim 4, wherein said superposed portions are substantially straightly extended in the longitudinal direction of the adjacent sections.

6. A temperature abnormality detecting structure according to claim 4, wherein said superposed portions are spirally wound around the adjacent sections.

7. A temperature abnormality detecting structure for a fluid pipe, for detecting a temperature abnormality location by laying, along the fluid pipe, an optical fiber serving as a temperature detecting portion of a Raman scattering optical fiber distribution type temperature sensor along a fluid pipe, wherein:

said fluid pipe is divided into a plurality of sections in a longitudinal direction of said fluid pipe, with adjacent ones of said sections meeting each other at a boundary;

said optical fiber is looped, substantially in a shape of an "l", in the longitudinal direction of the optical fiber at least at one portion thereof to form at least one "l"-shaped portion in the longitudinal direction of the optical fiber in the vicinity of a boundary of adjacent ones of said sections of said fluid pipe, to detect temperature data of the boundary of the adjacent sections; and data processing means for processing the detected temperature data to determine whether or not a temperature abnormality occurs at the boundary of the adjacent sections.

8. A temperature abnormality detecting structure according to claim 7, wherein said at least one "l"- shaped portion comprises a "l"-shaped portion formed on said boundary of the adjacent portions.

9. A temperature abnormality detecting structure according to claim 7, wherein said at least one "l"-shaped portion comprises first and second "l"-shaped portions formed on opposite edges, respectively, of an area of the boundary of the adjacent portions.

10. A temperature abnormality detecting structure according to claim 7, wherein said at least one "l"-shaped portion comprises a first "l"-shaped portion formed on said boundary of the adjacent portions, and second and third "l"-shaped portions formed on opposite edges, respectively, of an area of the boundary of the adjacent portions.

11. A temperature abnormality detecting structure for a fluid pipe, for detecting a temperature abnormality location by laying, along the fluid pipe, an optical fiber serving as a temperature detecting portion of a Raman scattering optical fiber distribution temperature sensor, wherein:

said fluid pipe is divided into a plurality of adjacent sections in the longitudinal direction, adjacent ones of said sections meeting each other at a boundary;

said optical fiber is laid along the fluid pipe and is folded back in multiple, with corners thereof forming substantially right angles, at least at one portion thereof in the longitudinal direction, to form a multi-superposed portion of the optical fibers, in the vicinity of a boundary of adjacent ones of said sections, to detect temperature data of the boundary of the adjacent sections; and data processing means for processing the detected temperature data to determine whether a temperature abnormality occurs or not at the boundary of the adjacent sections.

* * * * *